United States Patent
Chakra et al.

(10) Patent No.: US 10,764,159 B2
(45) Date of Patent: *Sep. 1, 2020

(54) DYNAMIC SYSTEM LEVEL AGREEMENT PROVISIONING

(71) Applicant: International Business Machines Corporation, Armonk, NY (US)

(72) Inventors: Al Chakra, Apex, NC (US); Rahul Ghosh, Durham, NC (US); Rocky D. McMahan, Pittsboro, NC (US); Vasanth Raghavan, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 577 days.

This patent is subject to a terminal disclaimer.

(21) Appl. No.: 14/496,868

(22) Filed: Sep. 25, 2014

(65) Prior Publication Data
US 2015/0156080 A1  Jun. 4, 2015

Related U.S. Application Data

(63) Continuation of application No. 14/096,300, filed on Dec. 4, 2013.

(51) Int. Cl.
*H04L 12/24* (2006.01)
*H04L 29/08* (2006.01)

(52) U.S. Cl.
CPC .......... *H04L 41/5006* (2013.01); *H04L 67/10* (2013.01); *H04L 41/5012* (2013.01); *H04L 41/5025* (2013.01)

(58) Field of Classification Search
CPC ................................................ H04L 41/5003
See application file for complete search history.

(56) References Cited

U.S. PATENT DOCUMENTS 7,437,449 B1 * 10/2008 Monga .................... H04L 12/24
 370/230
7,885,842 B1 * 2/2011 Bartolini ................ G06Q 10/06
 709/224

(Continued)

FOREIGN PATENT DOCUMENTS

WO  2002007037  1/2002

OTHER PUBLICATIONS

Walsh, W. E., G. Tesauro, J. O. Kephart, and R. Das. 'Utility Functions in Autonomic Systems'. Proceedings of the First International Conference on Autonomic Computing, May 17, 2004. [retrieved Oct. 1, 2015]. Retrieved from the Internet <URL: https://www.netlab.tkk.fi/opetus/s384030/k06/papers/UtilityFunctions.pdf>. *

(Continued)

*Primary Examiner* — Kevin T Bates
*Assistant Examiner* — Dae Kim
(74) *Attorney, Agent, or Firm* — James L. Baudino

(57) ABSTRACT

According to one aspect of the present disclosure a method and technique for dynamic system level agreement provisioning is disclosed. The method includes: identifying, by a data processing system of a computing environment service provider, service level criteria for a customer of computing services; determining characteristics of the computing environment; identifying a time period for providing the computing services; evaluating one or more utility functions defining service level variables; and automatically determining, by the data processing system, a service level agreement (SLA) provision for the customer based on the one or more utility functions.

9 Claims, 6 Drawing Sheets

(56) References Cited

U.S. PATENT DOCUMENTS

| | | | |
|---|---|---|---|
| 2005/0172291 A1* | 8/2005 | Das | G06F 9/5027 718/104 |
| 2006/0280161 A1* | 12/2006 | Liu | H04L 41/0816 370/351 |
| 2008/0195369 A1* | 8/2008 | Duyanovich | G06F 11/0709 703/22 |
| 2010/0177650 A1* | 7/2010 | Wittgreffe | H04J 3/14 370/252 |
| 2011/0131309 A1 | 6/2011 | Akiyama et al. | |
| 2011/0191781 A1 | 8/2011 | Karanam et al. | |
| 2011/0213712 A1 | 9/2011 | Hadar et al. | |
| 2011/0264805 A1 | 10/2011 | Breitgand et al. | |
| 2012/0089726 A1* | 4/2012 | Doddavula | H04L 67/34 709/224 |
| 2012/0131174 A1 | 5/2012 | Ferris et al. | |
| 2013/0086235 A1* | 4/2013 | Ferris | G06F 9/505 709/223 |
| 2013/0091282 A1* | 4/2013 | Tontiruttananon | G06F 9/5061 709/226 |
| 2013/0111035 A1* | 5/2013 | Alapati | G06F 9/5072 709/226 |

OTHER PUBLICATIONS

Yeo, C. S., and Buyya, R. 'Service level agreement based allocation of cluster resources: handling penalty to enhance utility'. 2005 IEEE International Conference on Cluster Computing (CLUSTER), Sep. 27, 2005 [retrieved on Apr. 13, 2016]. Retrieved from the Internet <URL: http://www.cloudbus.org/papers/sla-cluster2005.pdf>.*

Walsh, W. E., G. Tesauro, J. O. Kephart, and R. Das. 'Utility Functions in Autonomic Systems'. Proceedings of the First International Conference on Autonomic Computing, May 17, 2004. [retrieved on Oct. 1, 2015]. Retrieved from the Internet <URL: https://www.netlab.tkk.fi/opetus/s384030/k06/papers/UtilityFunctions.pdf>.*

Son, Seokho, et al. 'A SLA-based Cloud Computing Framework: Workload and Location Aware Resource Allocation to Distributed Data Centers in a Cloud'. Proceedings of the Int'l Conf on Parallel and Distributed Processing . . . , 2012.[retrieved on Sep. 17, 2016]. Retrieved from the Internet<URL: http://search.proquest.com/docview/1416805698?accountid=14753>.*

Maurer et al. 'Simulating Autonomic SLA Enactment in Clouds Using Case Based Reasoning', ServiceWave 2010, LNCS 6481, pp. 25-36, 2010 [retrieved on Oct. 23, 2017]. Retrieved from SpringerLink. DOI: 10.1007/978-3-642-17694-4_3. (Year: 2010).*

Simmons et al. 'Achieving High-Level Directives Using Strategy-Trees', MACE 2009, LNCS 5844, pp. 44-57, 2009 [retrieved on Oct. 24, 2017]. Retrieved from SpringerLink. DOI: 10.1007/978-3-642-05006-0_4. (Year: 2009).*

Teklinks, Inc.; TekCloud Service Agreement; Aug. 2012.

Cochran, Mitchell, et al.; Governance and Service Level Agreement Issues in a Cloud Computing Environment; Journal of Information Technology Management; vol. XXII, No. 2; 2011.

Ben-Yacoub et al.; Dynamic Resource Reservations for QoS Support in IP Networks; ComTec, vol. 79, No. 2; Feb. 2001; pp. 19-24.

* cited by examiner

DYNAMIC SYSTEM LEVEL AGREEMENT PROVISIONING

BACKGROUND

The cloud computing environment is an infrastructure level virtualization of computing resources that enables such resources or disparate devices appear to an end-user or customer as a single pool of seamless resources. These resources may include such things as physical or logical compute engines, servers and devices, device memory, storage devices, etc. A cloud service provider may be able to support different service levels to meet a customer's service needs, such as availability, response time, etc. These service levels or service level terms are often incorporated and/or otherwise made part of a service level agreement (SLA) between the customer and the service provider as a basis for guaranteeing and/or measuring the provided services.

BRIEF SUMMARY

According to one aspect of the present disclosure a method and technique for dynamic system level agreement provisioning is disclosed. The method includes: identifying, by a data processing system of a computing environment service provider, service level criteria for a customer of computing services; determining characteristics of the computing environment; identifying a time period for providing the computing services; evaluating one or more utility functions defining service level variables; and automatically determining, by the data processing system, a service level agreement (SLA) provision for the customer based on the one or more utility functions.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
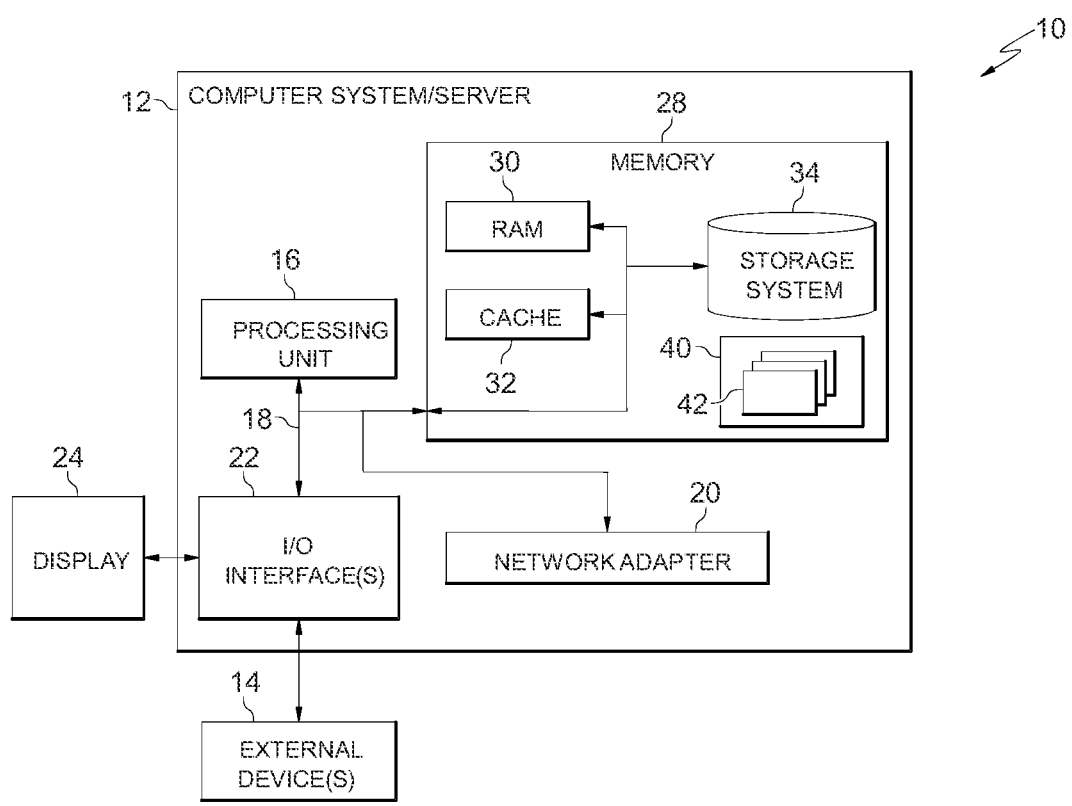
FIG. 1 depicts a cloud computing node according to an embodiment of the present invention.

Embodiments of the present disclosure provide a method, system and computer program product for dynamic system level agreement provisioning. For example, in some embodiments, the method and technique enables, given a cloud customer's service requirement and a service provider's capability, identification and automatic generation of a feasible and/or optimal set of SLA options/provisions. Embodiments of the present disclosure provide an SLA engine/module that develops/generates a customer-specific SLA as the customer is moving into the cloud resource environment. For example, as part of a customer initiating and/or requesting cloud resource services, the SLA module may evaluate and generate feasible sets of SLA terms and automatically provide the customer with a tailored/optimal SLA based on the customer's service needs (e.g., prior to deployment of services/resources) and/or cost budget. The SLA module may also update the SLA over a time horizon based on the dynamic business changes (e.g., of the customer and/or service provider). Thus, in some embodiments, a method and technique for dynamic SLA provisioning includes identifying service level criteria for a customer of computing services, determining characteristics of the computing environment, identifying a time period for providing the computing services, evaluating a utility function defining service level variables, and automatically determining an optimal service level agreement (SLA) provision for the customer based on the utility function.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with and instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
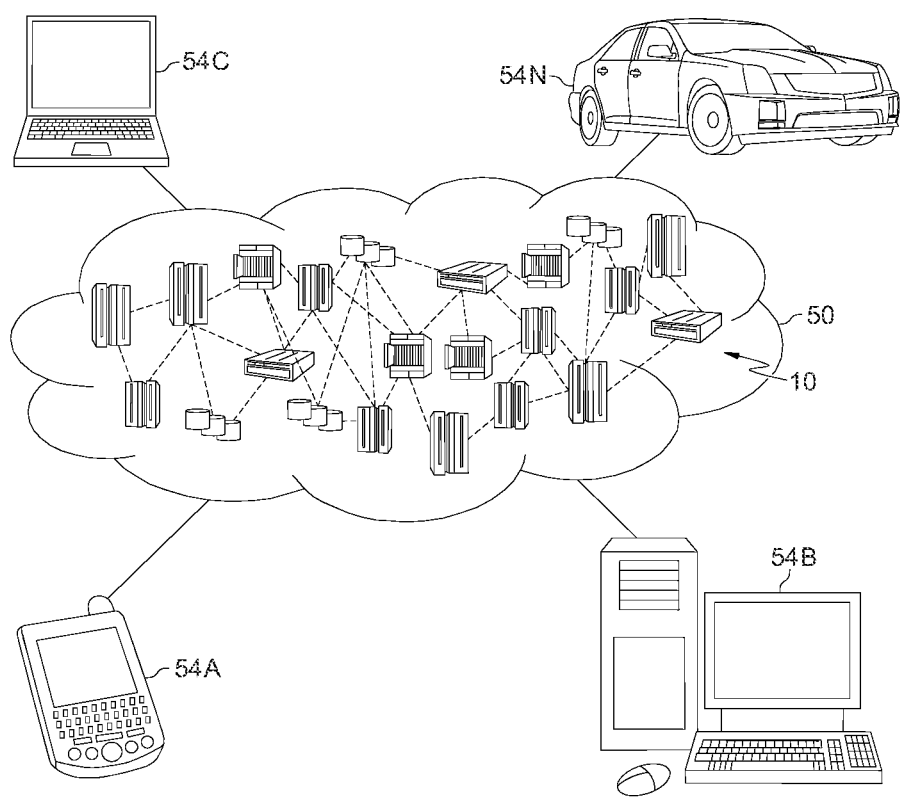
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
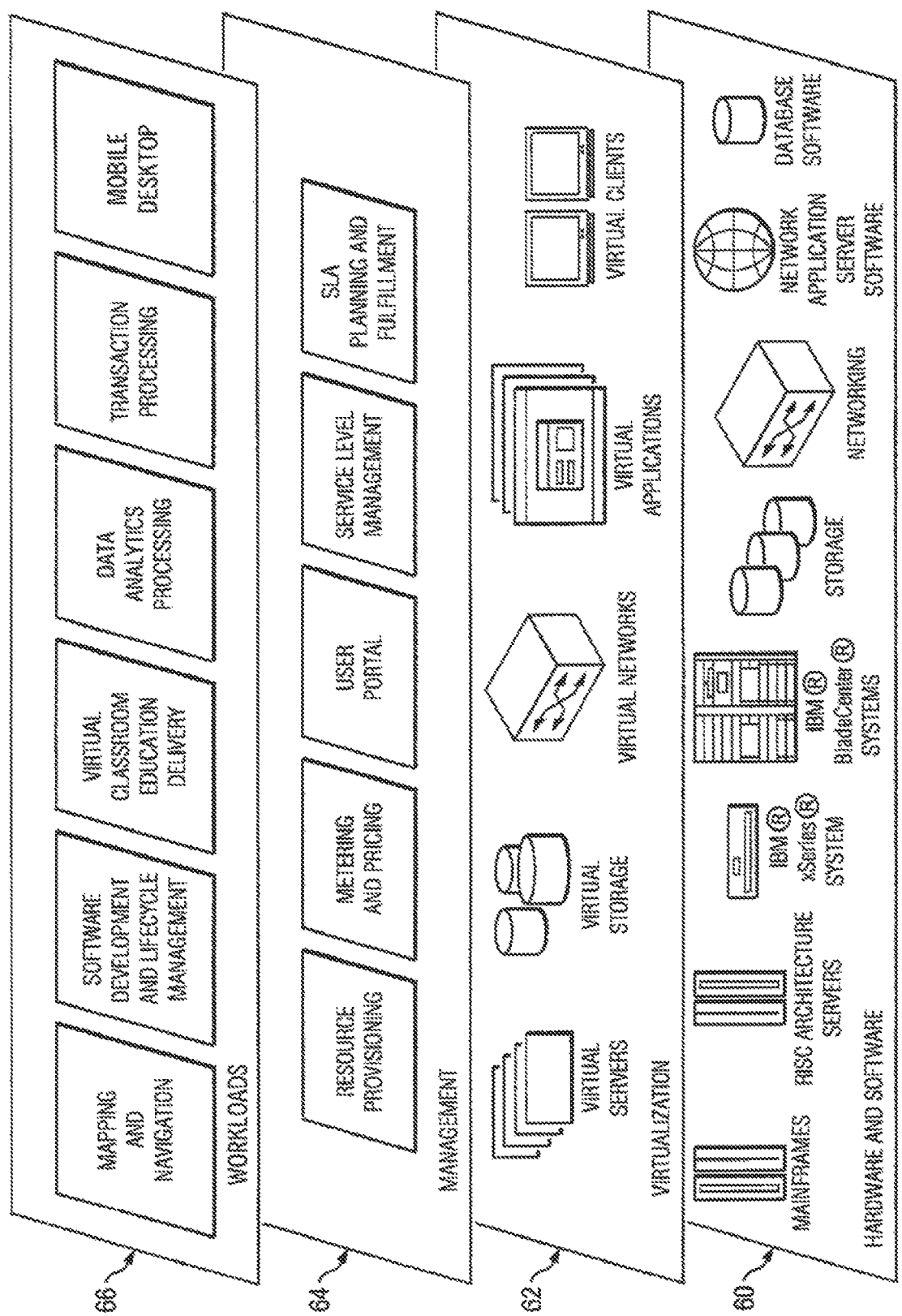
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual machines, including virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. Service level management may also include virtual machine allocation and management such that the migration and/or execution of virtual machine resources (e.g., various workload or application processing) complies with the geophysical host location.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop functions.

Figure 4:
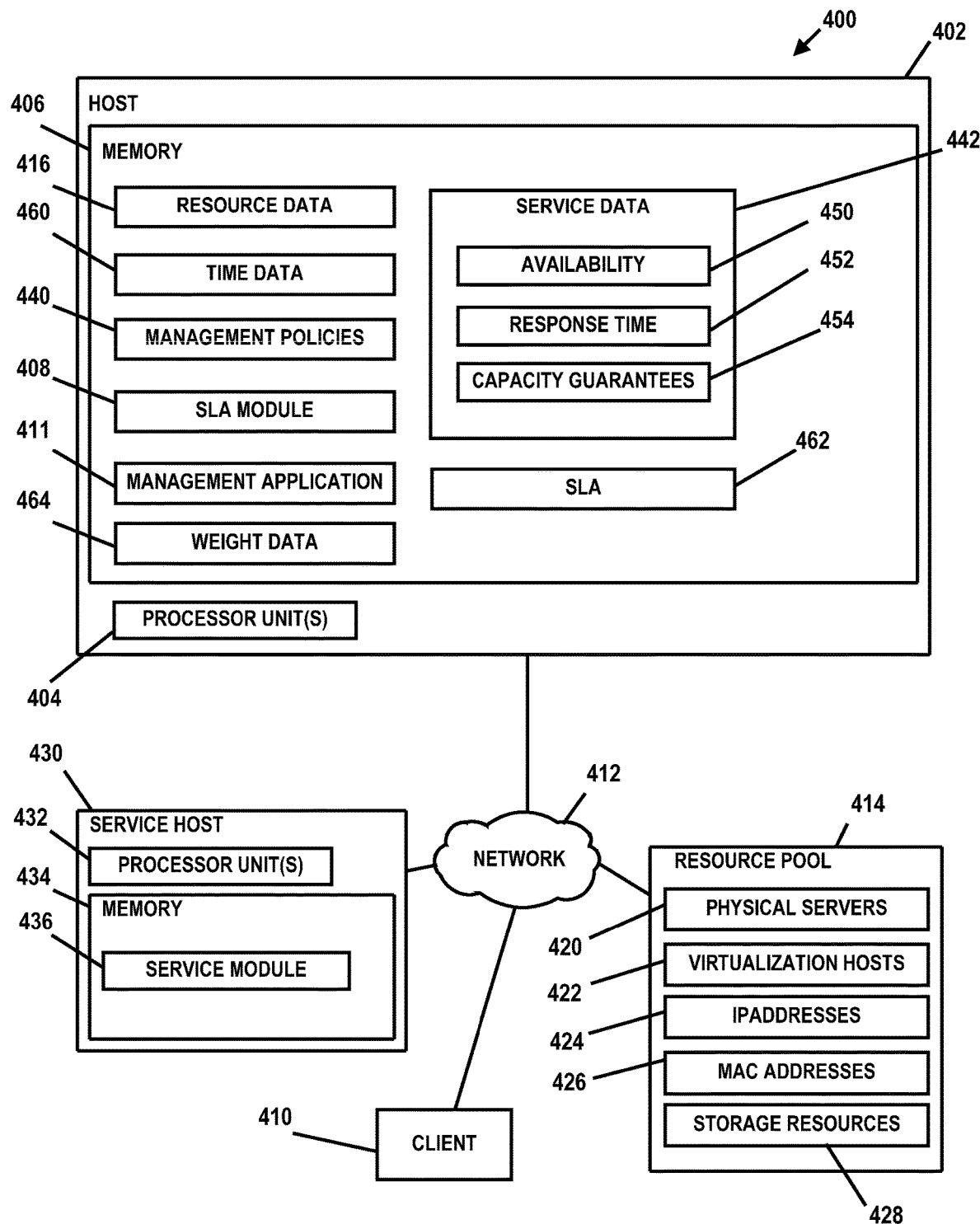
FIG. 4 depicts an embodiment of a data processing system in which illustrative embodiments of a system for dynamic system level agreement provisioning may be implemented according to the present disclosure.

FIG. 4 is an illustrative embodiment of a system 400 for dynamic system level agreement provisioning in/for a cloud or other type of computing environment. System 400 may be implemented on data processing systems or platforms such as, but not limited to, node 10 or at other data processing system locations. System 400 (e.g., all or portions thereof) may be implemented, for example, on hardware and software layer 60 and/or on management layer 64 as depicted in FIG. 3. Embodiments of the present disclosure provide a system and technique that provides a client/customer business moving towards a cloud or other type of computing environment with an optimal choice of SLA terms/provisions. Embodiments of the present disclosure determine/identify optimal terms/provisions of an SLA for a consumer based on a joint analysis of customer-specific needs and provider-specific environment infrastructure. Embodiments of the present disclosure provide a system and technique for determining an optimal SLA for a given customer and updating the SLA over a time horizon depending on dynamic business changes.

In the embodiment illustrated in FIG. 4, system 400 comprises a host 402 comprising a physical computer or any type of data processing platform of a computing or cloud environment service provider. Host 402 includes one or more processor units 404 (e.g., a CPU) capable of reading and executing instructions and/or running a variety of types of applications and a memory 406. In FIG. 4, memory 406 comprises a SLA module 408 for dynamically determining and/or specifying SLA provisions/terms for a consumer or client 410 in a cloud or other type of computing environment. For example, in FIG. 4, host 402 may include a management application 411 that can communicate over a network 412 to dynamically allocate (e.g., an on-demand allocation) various types of computing resources described and/or made available via a resource pool 414. Resource pool 414 may include a variety of types of computing resources such as, but not limited to, storage resources, memory resources, processing power resources, and networking resources. SLA module 408 and/or management application 411 may be implemented in any suitable manner that may be hardware-based, software-based, or some combination of both. For example, SLA module 408 and/or management application 411 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

In the embodiment illustrated in FIG. 4, memory also comprises resource data 416 comprising information associated with various computing resources that may be allocated and/or reserved for a resource request, such as various computing resources available from resource pool 414. Resource pool 414 includes various types of computing resources such as physical servers 420, the virtualization hosts 422, Internet protocol (IP) addresses 424, media access control (MAC) addresses 426, and storage resources 428. It should be understood that resource pool 414 may comprise additional and/or different types of computing resources besides those illustrated in FIG. 4.

In FIG. 4, a service host 430 is illustrated which may comprise an entity providing cloud computing as a service to its cloud customers or clients 410. Service host 430 may include one or more processor units 432 and a memory 434. In some embodiments, the customer or client 410 may interact with service host 430 to obtain cloud resource services; however, it should be understood that in some embodiments, the cloud customer or client 410 may interface directly with host 402. Thus, it should be understood that some components depicted and/or described in connection with host 420 may, alternatively or additionally, be located on service host 430 (e.g., SLA module 408). In FIG. 4, memory 434 includes a service module 436 which may be configured to provide an interface to enable a cloud customer or client 410 to request/obtain cloud computing resource services from service host 430 and/or specify service level goals/needs. Service module 436 may be implemented in any suitable manner that may be hardware-based, software-based, or some combination of both. For example, service module 436 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

Thus, resource data 416 may comprise information associated with computing resources from resource pool 414 such as, but not limited to, a size of various data centers/environments, various types of resource infrastructures, types of virtual infrastructures, nature of failure modes, capacity information, processing and/or response time information, reliability information, etc. In FIG. 4, memory 406 also includes management policies 440. Management policies 440 may comprise information associated with the management of the allocatable resources of resource pool 414 and/or cost information associated with various SLA criteria.

Memory 406 also includes service data 442. Service data 442 may comprise information associated with the goals and/or needs of cloud computing customer or client 410. For example, in the illustrated embodiment, service data 442 includes values and/or information associated with service availability 450, service response time 452 and service capacity guarantees 454. However, it should be understood that other types of service goals/parameters may be identified/specified by client 410 for resource services. In some embodiments, service data 442 may be received from client 410 when cloud computing services are desired/requested. For example, service module 436 may receive service information/data from client 410 and forward such service information/data to host 402 for use by SLA module 408. In FIG. 4, memory 406 also includes time data 460. Time data 460 may comprise information associated with a time period and/or duration corresponding to requested cloud computing services.

In operation, SLA module 408 analyzes resource data 416, service data 442 and time data 460 to determine and/or otherwise generate the provisions/terms of an optimal SLA 462 for client 410. In some embodiments, SLA module 408 utilizes a utility theory approach for determining/generating SLA 462. For example, in some embodiments, a utility function u( ) may be used to map a random variable to a real number (e.g., u: X→R). In this example, these random variables can be response time (RT), availability (AV), and/or other types of service parameters (e.g., as set forth in service data 442). In addition to individual utility functions (e.g., u(RT) for response time, and u(AV) for availability), a combined utility measure may also be used. The combined utility measure can be used to calculate/analyze/consider the joint effects of individual utilities. An example of such a combined utility is a linear combination of individual utilities. For example, $U_c$ may be denoted as the combined utility:

$$U_c = w_1 u_1 + w_2 u_2 + \ldots + w_n u_n$$

where, $u_1$, $u_2$ through $u_n$ represent the different individual utilities, where "w" designations represent different weights applied/used in connection with the different individual utilities, and where $w_1 + w_2 + \ldots + w_n = 1$. In different contexts, the weights "w" can have different meanings/values. For example, in one instance, presume that only two utilities are to be considered: a response time utility ($u_r(RT)$) and an availability utility ($u_a(AV)$). The combined utility may be:

$$U_c = w_r u_r(RT) + w_a u_a(AV)$$

Figure 5:
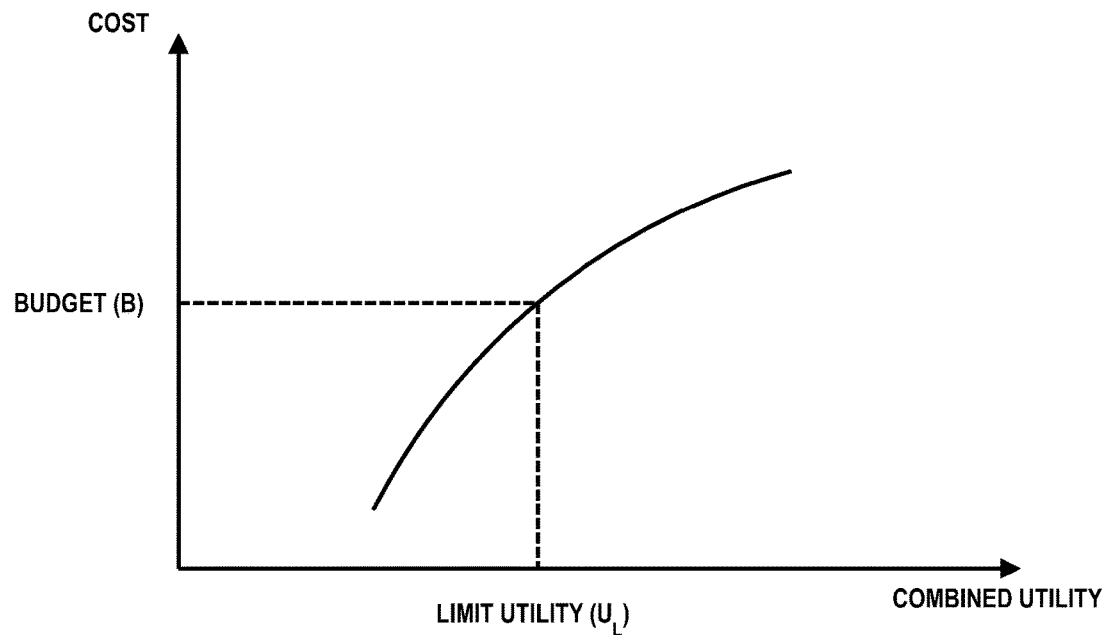
FIG. 5 is a diagram depicting a relationship between a utility function based on service SLA variables and cost.

The combined utility $U_c$ is also related to cost. Higher values of the combined utility may incur more cost. Different monotonic functions can be used for such combined utilities. One such example is depicted in FIG. 5, where a diagram illustrating a relationship between cost and combined utility is shown. In FIG. 5, a function of a budget (B) as related to an associated limit utility ($U_L$) is depicted. In some embodiments, SLA module 408 is used to maximize the combined utility without exceeding the limit utility value. As an example, consider client 410 requests a very qualitative requirement (e.g., low response time and high availability). For a given cloud resource provider, and for the specific set of customer/client 410 goals and service configurations, SLA module 408 takes as input different sets of feasible response time values and availability values. In this example, consider that response time values are 5 milliseconds, 3 milliseconds, and 1 millisecond, and consider that availability values are 90%, 95%, and 99%. SLA module 408 is used to determine/identify a combination(s) of these SLA terms/provisions that will maximize the combined utility.

In this example, let $u_r(5\ ms) = 1$, $u_r(3\ ms) = 2$, and $u_r(1\ ms) = 3$. Also, let $u_a(90\%) = 80$, $u_a(95\%) = 100$, and $u_a(99\%) = 160$. SLA module 408 functions to maximize $U_c = w_r u_r + w_a u_a$ with $w_r + w_a = 1$ and $U_c < U_L$. Each weight "w" may denote the probability of a cloud environment SLA violation because of a specific SLA violation. For example, $w_r$ may denote the probability of a SLA violation due to a response time violation, and $w_a$ may denote the probability of a SLA violation due to an availability violation. The values of such weights may be determined based on historical information for a given customer and/o service provider, as well as based on how different SLA violation events happen. If historical information is unavailable, SLA module 408 may use/assign a most probable cause of the SLA violation for a given configuration. In FIG. 4, information associated with such weight determinations and/or values is depicted as weight data 464. Table 1 below depicts an example where RT is defined as a violation that happened because of response time, and AV is defined as a violation that happened because of a lack of availability.

TABLE 1

| Event ID | Cause |
|---|---|
| 1 | RT |
| 2 | AV |
| 3 | AV |
| 4 | AV |
| 5 | RT |
| 6 | AV |
| 7 | AV |

In this example, $w_a=5/7$ (because out of seven violations, five violations happened due to availability) and $w_r=2/7$ (because out of seven violations, two violations happened due to response time). Note also that $w_a+w_r=1$.

Figure 6:
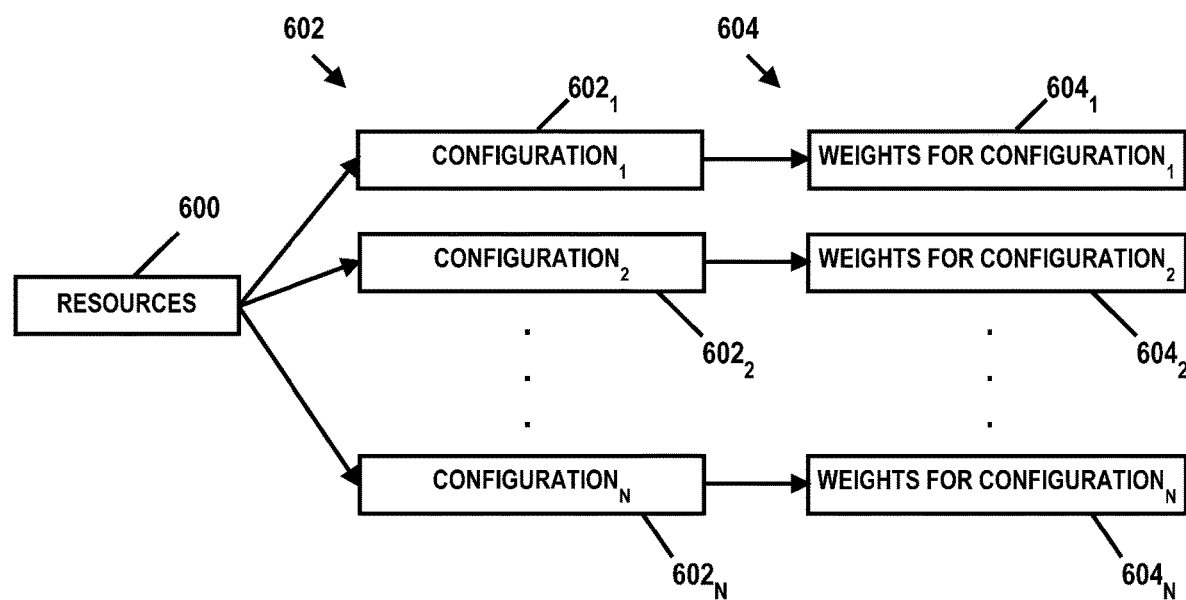
FIG. 6 is a diagram illustrating a relationship between different resource configuration and different weights applicable to SLA utility function variables according to the present disclosure.

The weights "w" are associated with different service/resource configurations that a service provider may offers to a customer/client 410. Each resource configuration may have different arrangements of resources, leading to different weights. For example, one customer/client may need ten physical machines. A service provider can provide the service by either running all ten machines in parallel or running one machine at a time while keeping other machines available for failover. Thus, the former configuration is designed for performance (low response time), while the latter configuration is designed for high availability. As a result, values of weights will change depending upon the configuration. FIG. 6 is a diagram illustrating different weight relationships that may result from different resource configurations. However, it should also be understood that one resource configuration can also have different weights if the underlying resources are different (e.g., faster vs. slower machines). In FIG. 6, resources 600 (e.g., from resource pool 414) may be selected according to one or more resource configurations 602 (e.g., configurations $602_{1-n}$) that meet a client's 410 needs. Depending on the particular configuration 602, values for various weights "w" 604 (e.g., for one or more service utilities) may vary based on the particular resource configuration 602 (e.g., weights $604_{1-n}$).

In operation, SLA module 408 receives the computing environment service goals/needs of a particular client 410 (e.g., service data 442) and evaluates various resource configurations 602 to determine/generate optimal terms/provisions for an SLA 462 for client 410. SLA module 408 may perform various utility model calculations/evaluations using different weight 604 values for different utility variables to attempt to maximize a combined utility value without exceeding a limit utility value/cost budget. SLA module 408 may also evaluate various resource configurations according to different time 460 variables (e.g., the length of the service needs of client 410 and/or changes in resource configurations or weight variables that occur over time). For example, in some embodiments, SLA module 408 may continue to monitor various performance, reliability and cost information/metrics associated with resources 600 and dynamically update/change SLA 462 in response to such changes. Thus, as additional information becomes available as to performance, reliability and cost information/metrics associated with resources 600 (e.g., even while client 410 is utilizing such services), SLA module 408 may periodically re-evaluate the optimal SLA 462 for client 410. Management policies 440 may also include information associated with external inputs that may be considered by SLA module 408 such as, but not limited to, market demands and cost/policies of competitor services.

Figure 7:
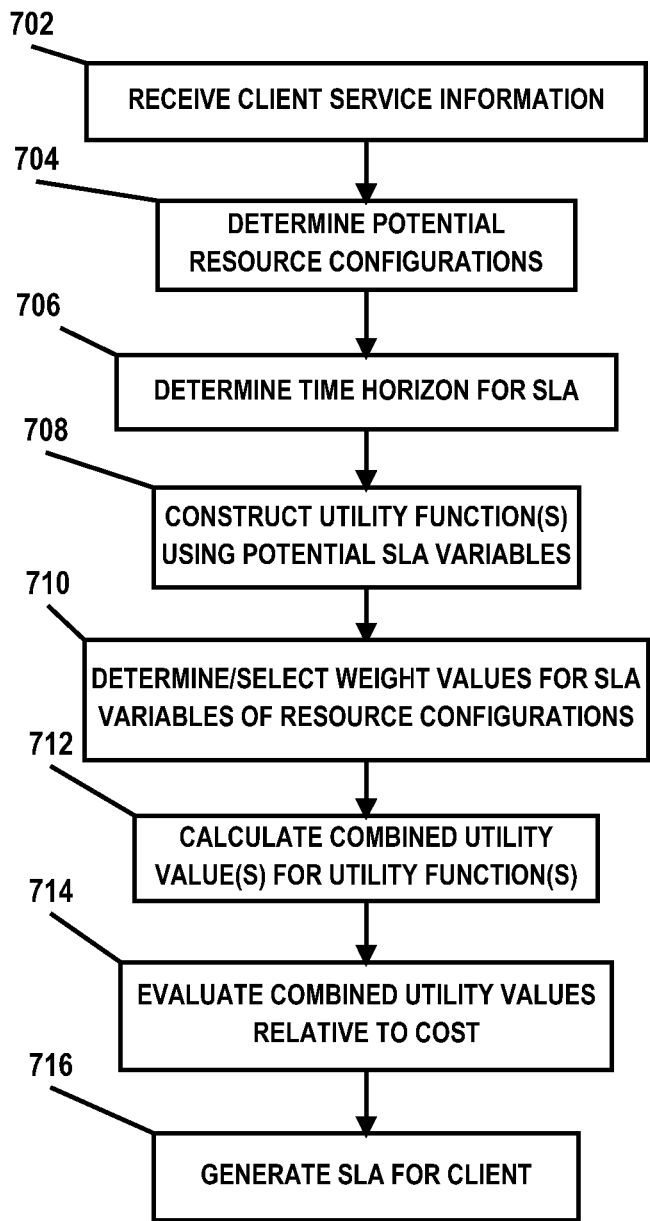
FIG. 7 depicts a flow diagram illustrating an embodiment of a method for dynamic system level agreement provisioning according to the present disclosure.

FIG. 7 is a flow diagram illustrating an embodiment of a method for dynamic system level agreement provisioning. The method begins at block 702, where client 410 service data 442 is received. At block 704, SLA module 408 (or management application 411) may determine different resource configurations applicable/feasible to meet the service needs of client 410. At block 706, SLA module 408 may determine a time period/horizon applicable to the SLA for client 410 (e.g., based on service data 442 and/or other information indicating a time period of applicability for providing services to client 410). At block 708, SLA module 408 constructs a utility function using potential SLA variables/provisions based on service data 442. At block 710, SLA module 408 determines and/or otherwise selects weight values 464 for utility function service level variables for the different resource configurations.

At block 712, SLA module 408 may calculate and/or otherwise evaluate different combined utility function values for the different resource configurations. At block 714, SLA module 408 may evaluate the combined utility function values relative to cost information associated with the potential SLA provisions/terms. At block 716, SLA module 408 generates and/or otherwise provides an optimal SLA 462 for client 410.

Thus, embodiments of the present disclosure enable, given a cloud customer's service requirement and a service provider's capability, identification and automatic generation of a feasible and/or optimal set of SLA options/provisions. Embodiments of the present disclosure provide an SLA engine/module 408 that develops/generates a customer-specific SLA as the customer is moving into the cloud resource environment. For example, as part of a customer initiating and/or requesting cloud resource services, SLA module 408 may evaluate and generate feasible sets of SLA terms and automatically provide the customer with a tailored SLA based on the customer's service needs (e.g., prior to deployment of services/resources). The SLA module 408 may also updates the SLA over a time horizon based on the dynamic business changes (e.g., of the customer and/or service provider).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, comprising:
identifying, by a data processing system of a computing environment service provider, service level criteria for requested computing services;
determining characteristics of the computing environment;
identifying a time period for providing the computing services;
constructing, by the data processing system, one or more utility functions defining service level variables corresponding to the service level criteria for the time period, the utility functions including a weight applied to each service level variable, the weight representing a probability of a violation of the respective service level variable;
evaluating the one or more utility functions against a plurality of computing resource configurations allocatable from a resource pool of the computing environment; and
allocating a select one of the computing resource configurations from the resource pool of the computing environment, by the data processing system, for the requested computing services based on the one or more utility functions being maximized based on the plurality of computing resource configurations without exceeding a limit utility value.

2. The method of claim 1, further comprising:
monitoring the computing environment over the time period; and
automatically updating the one or more utility functions based on a change to the computing environment.

3. The method of claim 1, wherein identifying service level criteria for the customer comprises receiving a specification of a response time parameter, an availability parameter, and a capacity parameter.

4. The method of claim 1, further comprising selecting the weight based on historical data of the computing environment.

5. The method of claim 1, further comprising selecting the weight based on a most probable cause of a respective service level variable violation for a respective computing resource configuration.

6. A method, comprising:
receiving, by a data processing system of a computing environment service provider, service level criteria for requested computing services;
determining characteristics of the computing environment;
identifying a time period for providing the computing services;
constructing, by the data processing system, for each of a plurality of different computing resource configurations a combined utility function defining service level variables corresponding to the service level criteria for the time period, the combined utility function assessing the joint effects of the service level variables;
selecting a weight to apply to each service level variable in the respective combined utility functions, the weight representing a probability of a violation of the respective service level variable;
evaluating the combined utility function for each of the plurality of different computing resource configurations; and
allocating, by the data processing system, a select one of the plurality of different resource configurations for the requested computing services based on a maximum value of the evaluated combined utility functions.

7. The method of claim 6, further comprising evaluating changes in the weights occurring over the time period.

8. The method of claim 6, further comprising selecting the weights based on historical data of the computing environment.

9. The method of claim 6, further comprising selecting the weights based on a most probable cause of a respective service level variable violation for a respective computing resource configuration.

* * * * *